(No Model.)
G. F. STRAWSON.
SEEDER AND FERTILIZER DISTRIBUTER.
No. 411,692. Patented Sept. 24, 1889.
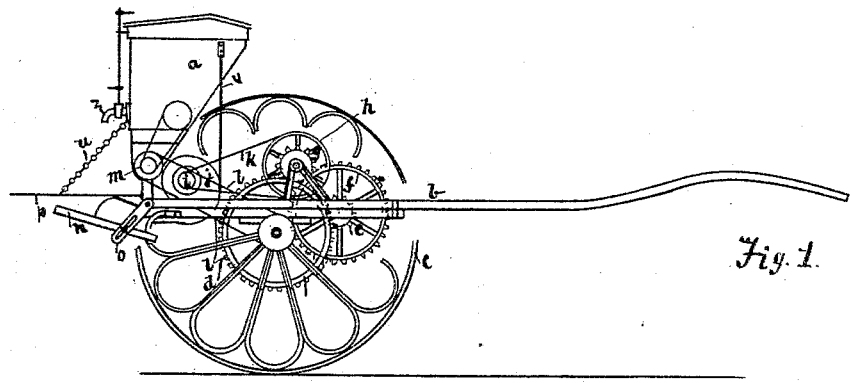
Fig. 1.
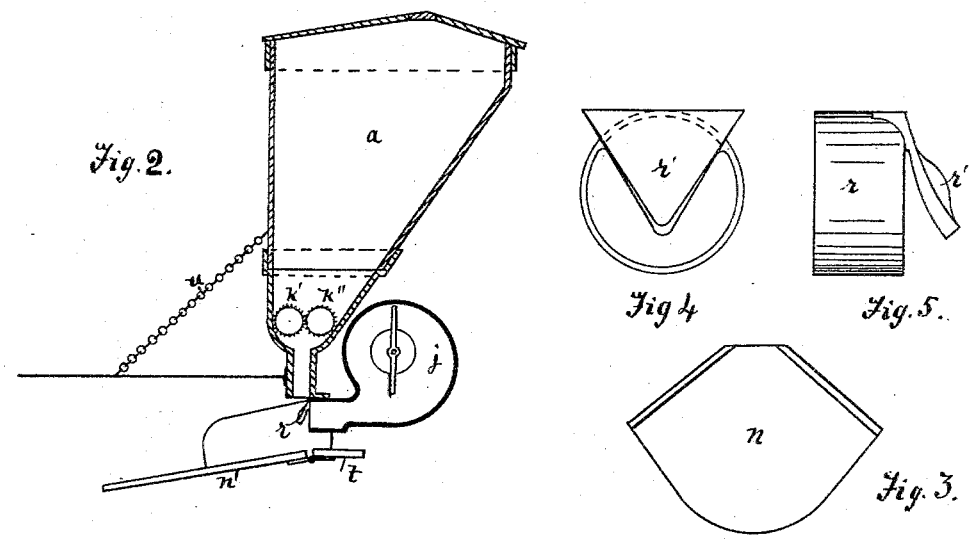
Fig. 2. Fig. 4. Fig. 5.
Fig. 3.
Witnesses
George S. Bell,
John F. Nelson.
Inventor
George Frederick Strawson
By Knight Bros
attys

UNITED STATES PATENT OFFICE.

GEORGE FREDERICK STRAWSON, OF NEWBURY, COUNTY OF BERKS, ENGLAND.

SEEDER AND FERTILIZER-DISTRIBUTER.

SPECIFICATION forming part of Letters Patent No. 411,692, dated September 24, 1889.

Application filed January 21, 1889. Serial No. 297,032. (No model.) Patented in England February 3, 1888, No. 1,615; in France December 5, 1888, No. 193,745, and in Canada May 4, 1889, No. 31,259.

*To all whom it may concern:*

Be it known that I, GEORGE FREDERICK STRAWSON, of Newbury, in the county of Berks, England, have invented a new and useful Seeder and Fertilizer and Insecticide Distributer, of which the following is a specification.

This invention is embodied in the following patents: England, Letters Patent No. 1,615, dated February 3, 1888; France, Brevet d'Invention No. 193,745, dated December 5, 1888; Canada, Letters Patent No. 31,259, dated May 4, 1889.

My invention relates to an implement or apparatus to be drawn over the ground by animal or other power for the broadcasting or scattering over such ground any kind of seed, fertilizing-compost, or insecticide. The implement comprises a suitable receptacle or hopper and the combination with certain distributing devices of coacting, feeding, and blowing devices operated by suitable geared or other connection with the traveling wheels.

In practice the implement is designed for ready conversion from a distributer of seed and of dry compost or insecticide in pulverulent condition to a distributer of insecticides.

The present specification and claims relate to that form of the implement which is adapted for distribution of seeds and matters in a dry and granulated or powdered condition.

Referring to the accompanying drawings, which form a part of this specification, Figure 1 is a partly-sectioned side elevation of an implement embodying my invention, portions of the ground or traveling wheel being removed. Fig. 2 is a section on a larger scale of the hopper and of the feeding, blowing, and scattering devices. Fig. 3 is a top view of the scattering or delivery board. Figs. 4 and 5 are respectively a front and side view of the blowing and distributing nozzle and spout.

$b$ is a frame carried by the ground or traveling wheels $c$, of which one only is here shown. Frame $b$ supports a hopper or receptacle $a$, which conducts the material to a contracted throat, as shown. Within said hopper, immediately above said throat, are two feed-rollers $k'\ k''$, which are rotated by geared or other suitable connection with each other and with one of the ground-wheels. Also, mounted on the frame $b$ is a fan or blower $j$, whose blades are rotated by belted or other suitable connection with the ground-wheel. The nozzle of said blower and the hopper-throat having the relative positions indicated in Fig. 2, all matters escaping through the hopper-throat encounter the blast which issues from the blower. A spout or deflector $r$, fixed immediately in front of the blower-nozzle, coacts with the jet of air therefrom to direct the seed, compost, or insecticide downward and rearward onto the scattering or delivery board $n$, whose hinged attachment $t$ and slotted brace $o$ enable it to be set at any desired angle. A wind-board $p$, suspended by chain $u$, coacts with the parts described in directing the escaping matters and preventing the access of interfering gusts of wind.

Ordinary belt-striking apparatus or clutches may be provided to enable disconnection of the operating mechanism from the drive-wheel, to enable the implement to be simply drawn over the ground or transported from place to place without action on the contained matters.

Having thus described my invention, the following is what I claim as new therein and desire to secure by Letters Patent:

1. In a pneumatic machine for distributing seeds and insecticide-powder or other dry composts, the combination of feeding device $k'\ k''$, delivery-nozzle $r$, and spreading or scattering board $n$.

2. In a pneumatic machine for distributing seed and dry insecticides and composts, the combination of feeding device $k'\ k''$, delivery spout or nozzle $r$, scattering-board $n$, and wind-guard $p$.

GEORGE FREDERICK STRAWSON.

Witnesses:
ERNST SEYMOUR SALAMAN,
  65 *and* 66 *Chancery Lane, London, England, Solicitor.*
JOHN HENRY JACK,
  1 *Castle Street, Holborn, London, England, Clerk.*